March 10, 1936. E. J. WARING 2,033,407
ANTISKID DEVICE
Filed Aug. 2, 1934
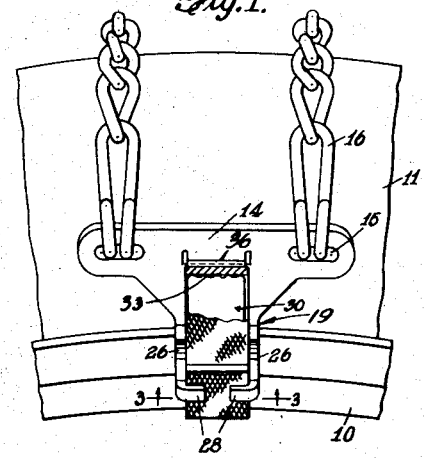
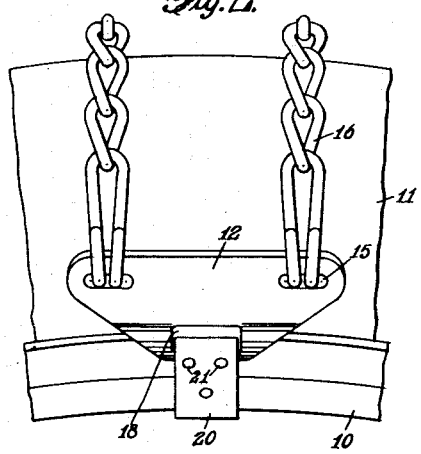
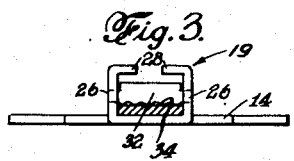
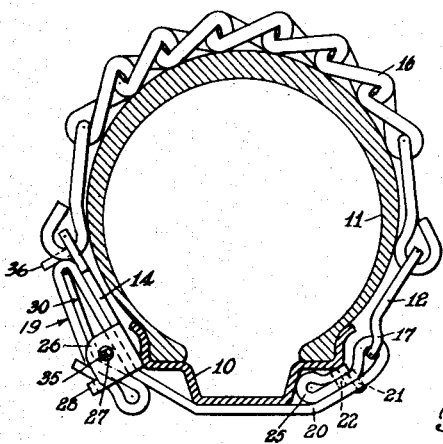
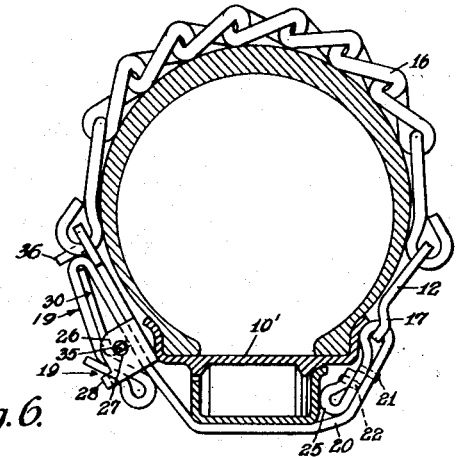
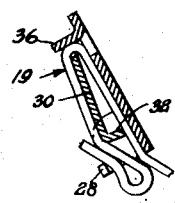
INVENTOR
Edward J. Waring
BY
Williams, Aich & Morse
ATTORNEYS Patented Mar. 10, 1936

2,033,407

UNITED STATES PATENT OFFICE 2,033,407

ANTISKID DEVICE

Edward J. Waring, Plainfield, N. J., assignor to Pyrene Manufacturing Company, Newark, N. J., a corporation of Delaware Application August 2, 1934, Serial No. 738,070

2 Claims. (Cl. 24—193)

This invention relates to buckles for use in anti-skid devices of the type generally referred to as emergency tire chains for use with automobiles.

An object of the present invention is to provide an improved buckle of the character mentioned which is strong, durable, reliable, and inexpensive to manufacture.

Other objects and advantages of the invention, when used in an emergency tire chain, will become apparent from the following description, taken in connection with the accompanying drawing, in which—

Fig. 1 is a fragmental side elevation of an automobile tire mounted on a wheel rim of a conventional drop-center type and having applied thereto an emergency tire chain in which the buckle emodying this invention is adapted for use.

Fig. 2 is a view similar to that of Fig. 1 and showing the tire chain as it would appear from the rear thereof.

Fig. 3 is a transverse, sectional view taken on line 3—3 of Fig. 1 and showing certain details of the buckle.

Fig. 4 is a view of the tire chain as it appears from the right in Fig. 1.

Fig. 5 is a view similar to that of Fig. 4 and showing the tire chain as applied to a tire mounted on a conventional type of demountable rim; and Fig. 6 is a central, longitudinal, sectional view of the buckle as it appears in Figs. 4 and 5.

Referring to Figs. 1 to 4, the numeral 10 indicates an automobile wheel rim of a conventional drop-center type on which is mounted an automobile tire 11, whereas in Fig. 5 the numeral 10' indicates a somewhat modified form of wheel rim which is of an ordinary demountable type.

The drawing shows an anti-skid device which includes a pair of spreaders 12 and 14, adapted to be positioned at opposite sides of the tire and rim assembly, as shown most clearly in Figs. 4 and 5. Each of the spreaders 12 and 14 is provided with a pair of elongated openings 15, adapted to receive the hook or end members, of two anti-skid cross-chains 16, which, when the device is attached in operative position, extend transversely across the tread of the tire and embrace the tire throughout the major portion of its transverse periphery.

As shown most clearly in Figs. 4 and 5, the spreader 12 is bent at one end to provide an offset lug 17, having, as shown most clearly in Fig. 2, an elongated opening 18 provided therein, which is adapted for the reception of one end of a fastening element, such as a strap 20. The strap 20 is permanently attached to the spreader 12 by threading it through the opening 18, then folding it back on itself and thereafter securing together its contiguous portions by rivets 21. The strap 20 is provided adjacent its point of connection with the spreader 12 with a restraining abutment 25, which is formed, prior to such time as the strap is attached to its associated spreader, by folding a portion of the strap back upon itself and securing the contiguous lengths together by a rivet 22. The restraining abutment 25, thus formed, is adapted to function, as will hereinafter more clearly appear, to prevent the device from creeping transversely of the tire and rim assembly under the influence of centrifugal force incident to rotation of the wheel.

As to the spreader 14, it is employed as the base portion of a buckle 19, by which the anti-skid device, as a whole, may be secured in an embracing position on the tire and rim assembly. The buckle 19, in which the invention is embodied, includes a pair of upturned ears 26, which are carried at opposite margins of the spreader and are provided with transversely aligned openings 27, the ears being spaced from each other a sufficient distance to accommodate one end of the strap 20 and provided at their outer ends with inwardly extending keeper lugs 28.

Associated with the spreader 14, is a clamp lever 30 which is bent at substantial right angles to provide a gripping tongue 32, the outer end of the lever and of the tongue being provided, respectively, with a plurality of more or less blunt teeth 33 and 34. The tongue 32 carries at its opposite sides a pair of pivot lugs 35 which are accommodated by the openings 27 of the ears 26 and serve to so hingedly connect the lever 30 to the ears as to permit the free end of the strap 20 to be passed between the spreader 14 and the clamp lever when attaching the device to the tire and rim assembly, it being understood that free entrance of the strap is permitted when the lever 30 is swung a slight distance outwardly from its clamping position. Upon threading the strap through the space afforded between the spreader 14 and the clamp lever 30, such strap may be easily drawn taut in order to tighten the chains 16 on the peripheral surface of the tire, whereupon the lever is moved to its clamping position, where the tension in the strap tends to maintain it, as will be readily understood from an inspection of Fig. 6. After moving the lever 30 to its clamping position, the free end of the strap is folded back abruptly on the lever 30 and then threaded through the space afforded between that lever and the keeper lugs 28, whereupon the extreme end of the strap is folded back on itself and passed beneath the keeper lugs 28 in a reverse direction, the double thickness of the strap material intermediate the lever and the keeper lugs being sufficient to so fill the space occupied thereby as to hold the free end of the strap against whipping about when the wheel is rotated and insure maintenance of the abrupt fold in the strap at its point of engagement with the free end of the lever, it being understood that due to the abrupt fold in the strap at the end of the lever a very pronounced snubbing action is produced and taken advantage of to hold the strap against undue lateral displacement and thus augment the holding effect of the gripping tongue 32 on the strap. In order to insure intimacy of contact between the strap and the outer end of the lever 30 so as to enhance the aforementioned snubbing action, as between the strap and lever, the spreader 14 is provided with a struck-out tongue or guard lug 36 which is of sufficient length and width to overlie the strap at and in the vicinity of its line of fold and is so located as to afford a clearance, between itself and the outer end of the lever when the lever is in clamping position, which is such with respect to the thickness of the strap that the strap is impinged between the tongue and lever. The tongue 36 is utilized not only to promote intimacy of contact between the strap 20 and the outer end of the lever 30, in the manner just described, but is also employed to guard or protect the strap against abrasion and other wear which would be encountered in actual use at the point where it is folded about the free end of the lever.

Inasmuch as the buckle-end of the anti-skid device, as a whole, is heavier than the opposite end, namely the end to which the strap 20 is permanently connected to the spreader 12, it is obvious that there exists a tendency for the device to move or creep, in a clockwise direction transversely of the tire and rim assembly as viewed in Figs. 4 and 5, under the influence of centrifugal force incident to rotation of the wheel, and that such creeping is prevented inasmuch as the restraining abutment 25 is adapted to so engage the tire and rim assembly, as shown in Figs. 4 and 5, as to effectively hold the device against undue displacement. In this connection it may be well to point out that the greater the weight of the buckle-end of the device with reference to the opposite end thereof, the greater will be the tendency of the device to creep in a clockwise direction, as viewed in Figs. 4 and 5, but inasmuch as the restraining abutment 25 effectively serves to resist undue movement despite such increased tendency, assurance will, therefore, be had that the device as a whole will be maintained in proper relation to the tread of the tire under any and all operating conditions.

Although only one form of the invention is herein shown, it will be understood that various changes may be made in the device per se and that it may be employed in connection with other forms of emergency tire chains without departing from the spirit of the invention or the scope of the following claims.

What is claimed is:

1. For use in an anti-skid device of the type adapted to be connected to an automobile tire and wheel rim assembly by a flexible strap, strap-end holding means comprising a base, a pair of ears connected to said base, a clamp lever pivotally connected to said ears and having a tongue beneath and by which the free end of said strap may be clamped in position, and a guard lug into an adjacent relation to which the outer end of said lever is adapted to be moved when clamping the free end of said strap and between which and the outer end of said lever the free end of said strap is adapted to be impinged.

2. For use in an anti-skid device of the type adapted to be connected to an automobile tire and wheel rim assembly by a flexible strap, strap-end holding means comprising a base, a pair of ears connected to said base, a clamp lever pivotally connected to said ears and having a tongue beneath and by which the free end of said strap may be clamped in position, a guard lug into an adjacent relation to which the outer end of said lever is adapted to be moved when clamping the free end of said strap and between which and the outer end of said lever the free end of said strap is adapted to be impinged, and retaining lugs carried by said ears and between which and said lever the free end of said strap is adapted to be confined in a folded-back position on said lever.

EDWARD J. WARING.